June 6, 1972  R. A. MOODY ET AL  3,667,710

FLEXIBLE STRAP FASTENER

Filed Aug. 26, 1970  2 Sheets-Sheet 1

INVENTORS.
ROY A. MOODY
JACK E. CAVENEY

BY *Evan D Roberts*

ATTORNEY

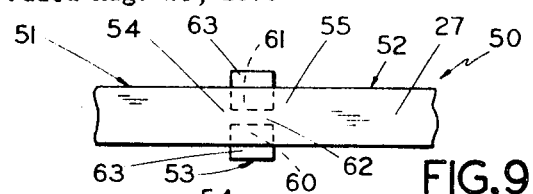
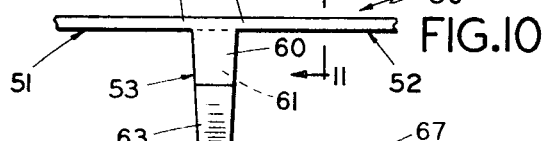
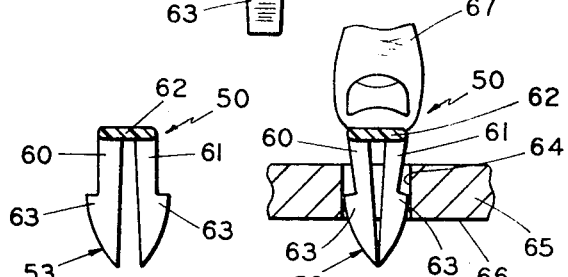
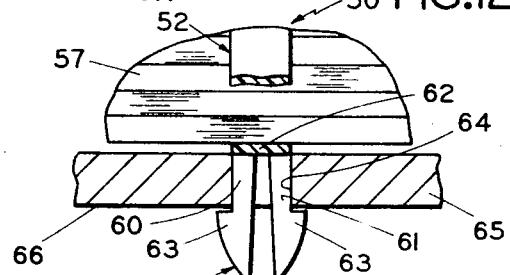
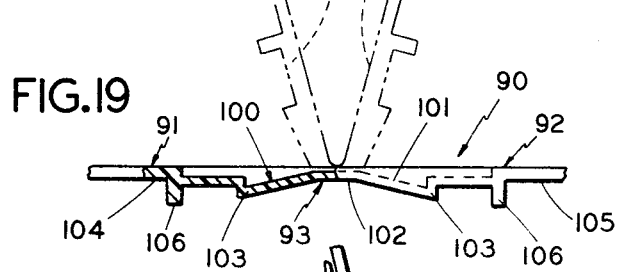
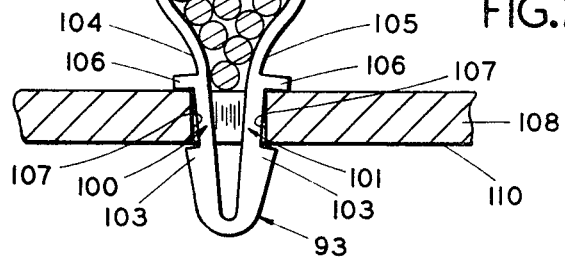
INVENTORS.
ROY A. MOODY
JACK E. CAVENEY
BY Evan D Roberts
ATTORNEY United States Patent Office 3,667,710
Patented June 6, 1972

3,667,710
FLEXIBLE STRAP FASTENER
Roy A. Moody, Flossmoor, and Jack E. Caveney, Chicago, Ill., assignors to Panduit Corp., Tinley Park, Ill.
Filed Aug. 26, 1970, Ser. No. 67,117
Int. Cl. F16l *3/14*
U.S. Cl. 248—71
16 Claims

ABSTRACT OF THE DISCLOSURE

A flexible strap fastener and several embodiments thereof are disclosed herein and include generally an elongated head strap portion, an elongated tail strap portion, and a resilient mount interconnecting said strap portions and adapted to be pushed into an opening in a panel to retain the entire strap fastener thereto. The head and tail straps are provided with a means for adjustable interconnection whereby the flexible strap fastener is formed into an article retaining loop.

SUMMARY OF THE INVENTION

This invention provides a flexible strap fastener which is readily securable in an opening in a panel or the like and which will adjustably accommodate and retain varying sizes of bundles of wires or other articles. In particular, an elongated head strap portion having a retaining head is connected to an elongated tail strap portion having a ratchet surface by means of a resilient mount portion which is readily insertable in an opening of a panel or the like whereby the head and tail strap portions of the flexible strap fastener will be secured to the panel. A passage and pawl are provided in the retaining head to adjustably receive and engage the ratchet surface of the tail strap to secure the tail and head straps into an article retaining loop which in turn is secured to the panel by the interconnecting mount. The straps of the fastener are adjustably secured to each other to accommodate varying sizes of articles in the loop formed thereby. Further, the mount is compressible, expandable, and uniquely interconnects the head and tail straps whereby the mount may be secured within the opening of the panel or the like.

It is a primary object of this invention to provide an improved flexible strap fastener having a mount between the ends thereof which is readily insertable into an opening in the panel to retain same to the panel.

A further primary object of this invention is to provide a flexible strap fastener having a laterally extending mount which, in turn, is laterally compressible by manual manipulation thereof, and laterally expandable by the installed or assembled tension load imposed thereon by the assembly and tightening of the strap about articles to be retained whereby the strap mount may be collapsed for fastening insertion in a panel opening, and yet is laterally expandable to assist in the fastening retention thereof in the opening when the flexible strap is looped and installed around articles to be retained thereby.

A further object of this invention is to provide a flexible strap fastener having a panel attaching mount which is expandable when the strap fastener is assembled about articles to assist in the retention thereof in the panel, but which is provided with a means for limiting the expansion whereby the flexible strap fastener can be assembled to the articles to be retained thereby prior to the insertion of the mount into the panel opening and the expansion of the mount will be contained within predetermined limits to facilitate the retentive insertion thereof in a panel opening.

Still another object of this invention is to provide a flexible strap fastener having adjustable article retaining straps for accommodating and retaining varying sized and shaped articles, and which is adapted to accommodate and retain these articles either before or after insertion of a mount thereof in a panel for retaining same to the panel.

Still further, another object of this invention is to provide a flexible strap fastener which is provided with adjustable and releasable retaining straps and a panel mount which is responsive to retention and release of the adjustable straps whereby the straps in addition to being adjustable and releasable retaining straps and a panel mount thereof is selectively insertable and releasable with respect to the panel in response to the operation of the straps.

Another further object of this invention is to provide a flexible strap fastener which may be molded substantially flat and which is provided with structure facilitating bending manipulation thereof to provide a resulting configuration which, in turn, provides the other various objects of this invention.

Other objects, advantages and novel aspects of the invention will become apparent upon consideration of the following detailed description in conjunction with the accompanying drawings wherein:

FIG. 9 is a top plan view of a third illustrative embodiment of the flexible strap fastener of this invention showing a U-shaped mount positioned with both legs thereof secured to both the head and the tail strap portions;

FIG. 10 is a partial side view of the third illustrative embodiment of the flexible strap fastener of this invention showing the general outer configuration of the mount of this embodiment;

FIG. 11 is a sectional view of the third illustrative embodiment of the flexible strap fastener of this invention taken along line 11—11 of FIG. 10 showing the general configuration and attachment of the mount thereof;

FIG. 12 is a partial sectioned end view of the third illustrative embodiment of the flexible strap fastener of this invention illustrating the manipulation and interreaction of the elements thereof (including the web) during insertion of the mount in a panel opening;

FIG. 13 is a partial sectional view of the third illustrative embodiment of the flexible strap fastener of this invention showing the strap mounted to a panel with the head and tail portions assembled into an article retaining loop about a bundle of wires;

FIG. 14 is a top plan view of a fourth illustrative embodiment of the flexible strap fastener of this invention showing a U-shaped mount positioned with both legs thereof secured to bifurcated ends of both the head and the tail strap portions;

FIG. 15 is a partial side view of the fourth illustrative embodiment of the flexible strap fastener of this invention showing the general outer configuration of the mount of this embodiment;

FIG. 16 is a sectioned view of the fourth illustrative embodiment of the flexible strap fastener of this invention taken along line 16—16 of FIG. 15 showing the general configuration and attachment of the mount thereof;

FIG. 17 is a partial sectioned end view of the fourth illustrative embodiment of the flexible strap fastener of this invention illustrating the manipulation and interreaction of the elements thereof during insertion of the mount in a panel opening;

FIG. 18 is a partial sectional view of the fourth illustrative embodiment of the flexible strap fastener of this invention showing the strap mounted to a panel with the head and tail portions assembled into an article retaining loop about a bundle of wires;

FIG. 19 is a partially sectioned partial side view of the fifth illustrative embodiment of the flexible strap fastener of this invention directly illustrating same in the as-molded condition, and indirectly illustrating same in the partially manipulated or bent position prior to installation thereof in the panel;

FIG. 20 is a partially sectioned view of the fifth illustrative embodiment of the flexible strap fastener of this invention showing the strap in the fully bent and manipulated condition, and partially inserted in an opening in the panel;

FIG. 21 is a partially sectioned partial top view of the fifth illustrative embodiment of the flexible strap fastener of this invention showing the strap completely bent, manipulated and partially inserted in a panel opening; and FIG. 22 is a partial sectional view of the fifth illustrative embodiment of the flexible strap fastener of this invention showing the strap mounted in the opening of a panel with the head and tail portions assembled into an article retaining loop about a bundle of wires.

Figure 1:
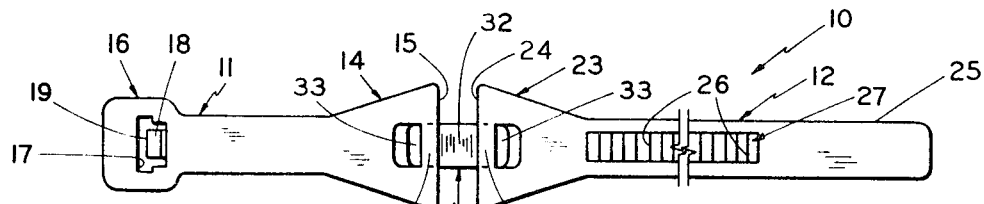
FIG. 1 is a top plan view of a preferred illustrative embodiment of the flexible strap fastener of the invention illustrating the general configuration thereof and the interconnection of the panel mount and the head and tail strap portion thereof in the as-molded condition.
Figure 2:
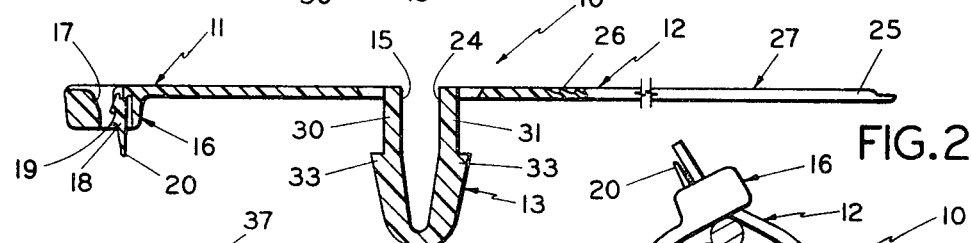
FIG. 2 is a partially sectioned side view of the preferred illustrative embodiment of the flexible strap fastener of this invention showing details of the panel mount thereof.
Figure 3:
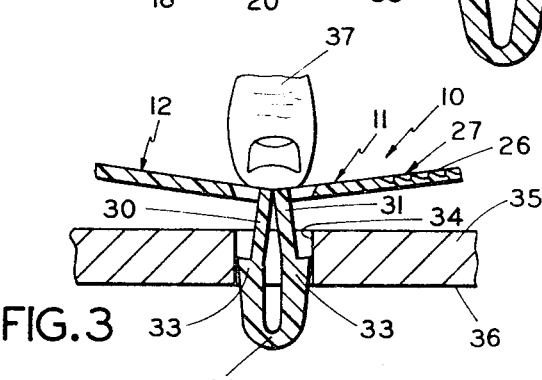
FIG. 3 is a partial sectional view of the preferred illustrative embodiment of the flexible strap fastener of this invention illustrating the manipulation and interreaction of the elements thereof during insertion of the mount in a panel opening.
Figure 4:
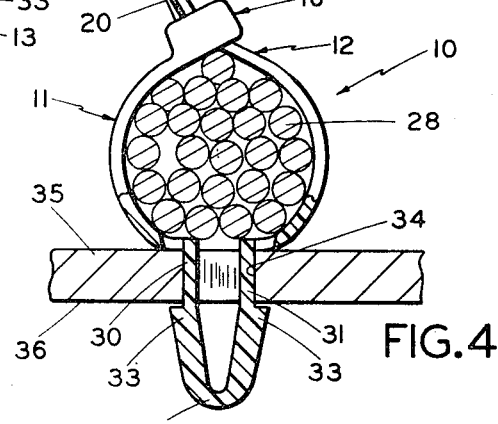
FIG. 4 is a partially sectioned view of the preferred illustrative embodiment of the flexible strap fastener of this invention showing the strap mounted to a panel with the head and tail portions assembled into an article retaining loop about a bundle of wires.

Referring to the drawings, there is illustrated (FIGS. 1-4), a first preferred illustrative embodiment 10 of the flexible strap fastener of this invention which includes generally a head strap portion 11, a tail strap portion 12 and a resilient mount portion 13.

Head strap 11 is of generally elongated configuration with an enlarged section 14 at one end 15 and a retaining head 16 at the other end. Retaining head 16 is provided with a passage 17 for receiving tail strap portion 12. A pawl 18 with teeth 19 is secured to retaining head 16 and is biased into passage 17 to engage and retain tail strap portion 12 when same as inserted through passage 17. Pawl 18 is provided with a tab 20 which may be manually or otherwise manipulated to disengage pawl 18 to release tail strap 12.

Tail strap portion 12 (FIGS. 1-4) is of generally elongated configuration with an enlarged portion 23 at one end 24 and a tip 25 at the other end. Tail strap 12 has a series of teeth 26 to provide a general ratchet surface 27 adapted to complementally engage teeth 19 of pawl 18 when tail strap 12 is inserted in passage 17 of retainer head 16. Head 16 will, thus, retain tail strap 12 against withdrawal from head 16 to form a retaining loop for articles 28 (FIG. 4) such as a bundle of wires or the like.

Mount 13 as illustrated (FIGS. 1-4) is generally resilient and U-shaped with legs 30 and 31 thereof respectively attached at one end to the ends 15 and 24 of head and tail straps 11 and 12, and at the other end to a nose 32. Tapered barbs or projections 33 are provided on the outer sides of mount 13 to extend radially beyond an opening 34 (FIGS. 3 and 4) in a panel 35, on the other side 36 of panel 35 when mount 13 is inserted therein (FIG. 4), to retain same against removal from the panel.

It should be noted that the configuration of mount 13 and the resiliency thereof provide a longitudinally yieldable connection between head and tail straps 11 and 12 which will tend to maintain the relative position thereof. Also, mount 13 can be resiliently compressed for insertion within openng 34 (FIG. 3) and expanded under tension load conditions (FIG. 4) when tail strap 12 is assembled with head strap 11 tightly around articles 28.

Thus, strap 10 is readily longitudinally compressible (FIG. 3) by bending mount 13 about nose 32 thereof with tapered barbs 33 reacting with opening 34 as a result of a simple force from a finger 37 or the like. Further, strap 10 is attachable to a panel 35 and is retained thereto by the projections 33 as a result of the expandable bias in mount 13 about nose 32, and the separation tension between legs 30 and 31 thereof as provided by the tension load imposed thereon by the assembly of the head and tail straps 11 and 12 tightly in tension around articles 28.

Figure 5:
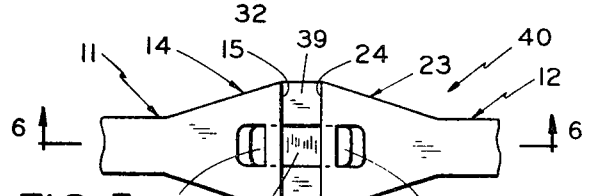
FIG. 5 is a partial top plan view of a second illustrative embodiment of the flexible strap fastener of this invention showing a mount retaining web between the ends of the head and tail strap portions.
Figure 6:
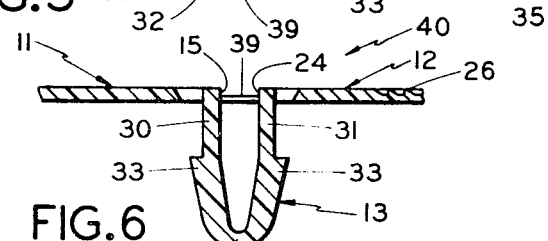
FIG. 6 is a partial sectional view of the second illustrative embodiment of the flexible strap fastener of this invention taken along line 6—6 of FIG. 5 showing the configuration of the mount retaining web in the as-molded condition.
Figure 7:
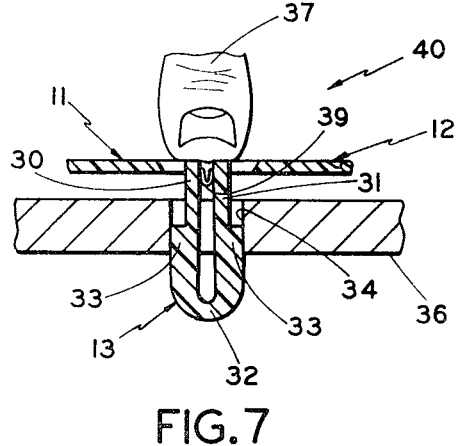
FIG. 7 is a partial sectional view of the second illustrative embodiment of the flexible strap fastener of this invention illustrating the manipulation and interreaction of the elements thereof (including the web) during insertion of the mount in a panel.
Figure 8:
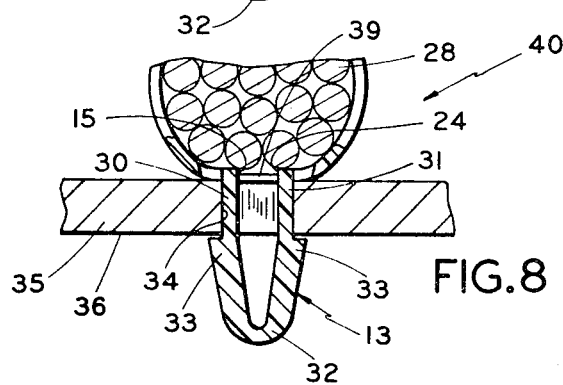
FIG. 8 is a partial sectional view of the second illustrative embodiment of the flexible strap fastener of this invention showing the strap mounted to a panel with the head and tail portions assembled into an article retaining loop about a bundle of wires.

FIGS. 5-8 illustrate a second illustrative embodiment of the flexible strap fastener of this invention which is substantially identical with the embodiment 10 illustrated in FIGS. 1-4, but which is provided with a web of film means 39 and is generally designated by the numeral 40. All of the remaining elements of the strap 40 (FIGS. 5-8) are identical with those of strap 10 (FIGS.1-4), and accordingly, are enumerated the same to the extent shown in FIGS. 5-8.

Web 39 in second embodiment 40 provides a collapsible means for limiting the longitudinal expansion between head and tail straps 11 and 12 of strap fastener 40 whereby strap fastener 40 can be assembled about articles 28 (FIG. 8) prior to insertion of mount 13 in panel 35 (FIG. 7) without entry of articles 27 between legs 30 and 31 of mount 13, and without expansion of mount 13 beyond that which would physically allow insertion thereof in the given size panel opening 34.

It should be noted (FIGS. 5-8) that the configuration of mount 13 of embodiment 40 and resiliency of the mount provide a longitudinally yieldable connection between head and tail straps 11 and 12 similar to that of strap 10 (FIGS. 1-4) but which will, with the controlling effects of web means 39, more readily maintain the relative longitudinal position between head and tail straps 11 and 12 of strap fastener 40. Also, mount 13 can be resiliently compressed for insertion within opening 34 (FIG. 7) and yet expanded to the limits of web means 39 under the tension load conditions (FIG. 8) imposed when tail strap 12 is assembled with head strap 11 tightly around articles 28.

Thus, strap fastener 40 is readily longitudinally compressible (FIG. 7) by bending mount 13 about nose 32 and collapsing web means 39 with tapered barbs 33 reacting with opening 34 as a result of a simple force from a finger 37 or the like. Further, strap 40 is attachable to panel 35 and is retained thereto by projections 33 as a result of the expandable bias in mount 13 about nose 32, and the separation tension between legs 30 and 31 thereof, to the extent permitted by web 39, as provided by the tension load imposed thereon by the assembly of the head and tail straps 11 and 12 tightly in tension around articles 28.

Referring to FIGS. 9–13, a third illustrative embodiment 50 of the flexible strap fastener of this invention is illustrated which includes, generally, a head strap portion 51, a tail strap portion 52 and a resilient mount portion 53.

Head strap 51 is of generally elongated configuration having an inner end portion 53 (FIGS. 9 and 10) and a retaining head (not shown) at the other end as described in regard to embodiments 10 and 40 (FIGS. 1–4 and 5–8). Tail strap 52 (FIGS. 1–4) is of generally elongated configuration having an inner end portion 55 (FIGS. 9 and 10) and a series of teeth (not shown) on a surface thereof as described in regard to embodiments 10 and 40 (FIGS. 1–4 and 5–8) to provide a surface adapted to complementally engage the retainer head to retain tail strap 52 against withdrawal therefrom to form a retaining loop for articles 57 (FIG. 13) such as a bundle of wires or the like as previously described in detail.

Mount 53 as illustrated (FIGS. 9–13) is generally resilient and U-shaped with legs 60 and 61 joined by a normally flat resilient mount base portion 62. Mount portion 62 is attached to strap ends 54 and 55 of head and tail straps 51 and 52 whereby tension in the straps 51 and 52 will tend to return portion 62 to the normally flat condition thereof. Tapered barbs or projections 63 are provided on the outer sides of legs 60 and 61 of mount 13 to extend radially beyond an opening 64 (FIGS. 12 and 13) in a panel 65, on the other side 66 of panel 65 when mount 53 is inserted therein (FIG. 12), to retain same against removal from the panel 65.

It should be noted (FIGS. 9–13) that the configuration of mount 53 and the resiliency of joining portion 62 thereof provide a yieldable connection between head and tail straps 51 and 52 which will maintain the relative longitudinal dimension thereof. Also, mount 53 can be resiliently laterally compressed for insertion within opening 64 (FIG. 12) by bringing legs 60 and 61 toward each other and flexing portion 62 against the normal bias thereof. Further, mount 53 will be expanded under tension load conditions (FIG. 13) when tail strap 52 is assembled with head strap 51 tightly in tension around articles 57, tending to straighten portion 62 to its normal flat condition.

In conjunction with the above, strap 50 is further retained to panel 65 by the spreading of mount projections 63 as a result of the expandable bias in mount 53 about portion 62, and the separation tension imparted to legs 60 and 61 thereof by the tension load assembly of the head and tail straps 51 and 52 around articles 57.

Referring to FIGS. 14–18, a fourth illustrative embodiment 70 of the flexible strap fastener of this invention is illustrated which includes, generally, a head strap portion 71, a tail strap portion 72 and a resilient mount portion 73.

Head strap 71 is of generally elongated configuration having an inner normally open bifurcated end portion 74 (FIGS. 14 and 15) and a retaining head (not shown) at the other end as described in regard to embodiments 10 and 40 (FIGS. 1–4 and 5–8). Tail strap 72 (FIGS. 1–4) is of generally elongated configuration having an inner normally open bifurcated end portion 75 (FIGS. 14 and 15) and a series of teeth (not shown) on a surface thereof as described in regard to embodiments 10 and 40 (FIGS. 1–4 and 5–8) to provide a surface adapted to complementally engage the retainer head to adjustably retain tail strap 72 against withdrawal therefrom to form a retaining loop for articles 77 (FIG. 18) such as a bundle of wires of the like as previously described in detail.

Mount 73 as illustrated (FIGS. 14–18) is generally resilient and U-shaped with legs 80 and 81 joined by a flat resilient normally open nose portion 82. Legs 80 and 81 are each attached to bifurcated strap ends 74 and 75 of head and tail straps 71 and 72 whereby tension in the straps 71 and 72 will tend to return nose 82 to the normally open condition, and the bifurcated portions 74 and 75 to the normally open and flat condition. Tapered barbs or projections 83 are provided on the outer sides of legs 80 and 81 of mount 73 to extend radially beyond an opening 84 (FIGS. 17 and 18) in a panel 85, on the other side 86 thereof when mount 73 is inserted therein (FIG. 18), to retain same against removal from the panel 85.

It should be noted (FIGS. 14–18) that the bifurcated strap configurations 74 and 75, the configuration of mount 73, and the resiliency of portions 74 and 75, as well as mount 73, provide a laterally and longitudinally yieldable connection between head and tail straps 71 and 72 which will maintain the relative dimensional relationship thereof. Also, mount 73 can be laterally manually resiliently compressed by fingers 87 or the like from a normally open configuration for insertion within opening 84 (FIG. 17) by bringing bifurcated portions 74 and 75, and legs 60 and 61 toward each other, flexing nose 82 and bifurcated portions 74 and 75 against the normal open bias thereof. Further, mount 73 will be expanded under tension load conditions (FIG. 18) when tail strap 72 is assembled with head strap 71 tightly in tension around articles 77, tending to laterally return bifurcated portions 74 and 75 and mount 73 to the normal configuration.

In conjunction with the above, strap 70 is further retained to panel 85 by the spreading of mount projections 83 as a result of the expandable bias in mount 73 about nose 82, and the separation tension imparted to normally open bifurcated portions 74 and 75 by the tension load assembly of the head and tail straps 71 and 72 around articles 77.

Referring to FIGS. 19–22, a fifth illustrative embodiment 90 of the flexible strap fastener of this invention is illustrated which includes, generally, a head strap portion 91, a tail strap portion 92 and a resilient mount portion 93.

Head strap 71 is of generally elongated configuration having a retaining head 96 (FIG. 22) at the other end as described in detail in regard to embodiments 10 and 40 (FIGS. 1–4 and 5–8). Tail strap 92 (FIGS. 19–22) is of generally elongated configuration having a series of teeth (not shown) on a surface thereof as described in detail in regard to embodiments 10 and 40 (FIGS. 1–4 and 5–8) to provide a surface adapted to complementally engage the retainer head 96 to adjustably retain tail strap 92 against withdrawal therefrom to form a retaining loop for articles 97 (FIG. 22) such as a bundle of wires or the like as previously described in detail.

Mount 93 as illustrated (FIGS. 19–22) is generally resilient, straight and elongated with legs 100 and 101 joined by a resilient normally straight, open and flat nose portion 102. Legs 100 and 101 are each attached to strap end portions 104 and 105 of head and tail straps 91 and 92 adjacent flanges 106 of the mount 93. Tapered barbs or projections 103 are provided on the outer sides of legs 100 and 101 of mount 93 to extend radially beyond an opening 107 (FIGS. 20 and 22) in a panel 108 on the other side 110 thereof when mount 93 is folded or bent about 102 (FIGS. 19 and 20) and inserted in opening 107 (FIG. 20) to retain same against removal from the panel 108.

It should be noted (FIGS. 19–22) that the strap configurations 94 and 95, the normally straight configuration of mount 93, and the resiliency of nose 102 provide a laterally and longitudinally yieldable connection between head and tail straps 91 and 92 which will maintain the relative dimensional relationship thereof. Also, mount 93 can be laterally manually resiliently compressed (FIG. 20) for insertion within opening 84 by bringing legs 100 and 101 toward each other about flexible nose 102 against the normal open and straight bias thereof. Further, mount 93 will be expanded under tension load conditions (FIG. 22) when tail strap 92 is assembled with head strap 91 tightly in tension around articles 97, tending to laterally open legs 100 and 101 of mount 93.

In all embodiments of this invention, a preferred material of construction is a suitable synthetic organic plastic resin; the preferred resin being one of the polyamide resins; and the resin must be sufficiently flexible to accommodate the deformation and flexing of the parts of the strap fastener as illustrated throughout the drawings.

In conjunction with the above, strap 90 is further retained to panel 108 by the spreading of mount projections 103 as a result of the expandable bias in mount 93 about nose 102, and the separation tension imparted to normally open nose 102 by the tension load assembly of the head and tail straps 91 and 92 tightly around articles 97.

It is to be understood that the invention is not to be limited to the specific constructions and arrangements shown and described, as it will be understood to those skilled in the art that certain changes may be made without departing from the principles of the invention.

What is claimed is:

1. A flexible strap fastener to be secured in an opening in a panel or the like from one side of the panel and to adjustably retain a bundle of wires or other articles comprising an elongated head strap portion having a retaining head spaced from an inner end, an elongated tail strap portion having an inner end, a resilient mount portion secured to said inner ends of said head and tail strap portions and extending laterally therefrom for longitudinally interconnecting said head and tail strap portions and for resiliently engaging the panel in the opening thereof to fasten the flexible strap to the panel, said mount portion being generally U-shaped and resilient in the longitudinal direction of said strap portions with the head strap portion end secured to the end of one leg of said mount portion and the tail strap portion end secured to the other leg of said mount portion to provide increased retention of said mount portion in said panel due to tension in the strap fastener when the strap fastener is installed around retained articles, and a collapsible flexible web means between the legs of said U-shaped mount to flexibly limit longitudinal expansion and to collapsibly allow contraction between the legs of said U-shaped mount and said head and tail strap portions, whereby the strap fastener can be assembled about articles prior to insertion of said mount in the panel and precluding entry of the articles between the legs of said mount and precluding expansion of said mount beyond that which allows insertion thereof in the given panel opening.

2. A flexible strap fastener to be secured in an opening in a panel or the like from one side of the panel and to adjustably retain a bundle of wires or other articles comprising an elongated head strap portion having a retaining head spaced from an inner end, an elongated tail strap portion having an inner end, a resilient mount portion secured to said inner ends of said head and tail strap portions and extending laterally therefrom for longitudinally interconnecting said head and tail strap portions and for resiliently engaging the panel in the opening thereof to fasten the flexible strap to the panel, said mount being generally U-shaped and normally open with the ends of the legs thereof respectively secured to the ends of said head and tail strap portions, said retaining head being adapted to longitudinally adjustably receive and retain said tail strap to form the flexible strap fastener into a loop of adjustable size for retaining various sized articles, and a collapsible flexible web means between the legs of said U-shaped mount to flexibly limit longitudinal expansion and to collapsibly allow contraction between the legs of said U-shaped mount and said head and tail strap portions whereby the strap fastener can be assembled about articles prior to insertion of said mount in the panel and precluding entry of the articles between the legs of said mount and precluding expansion of said mount beyond that which allows insertion thereof in the given panel opening.

3. A flexible strap fastener as defined in claim 2 wherein said retaining head is adapted to releasably receive and retain said tail strap to form the flexible strap fastener into a releasable article retaining loop.

4. A flexible strap fastener as defined in claim 2 wherein said mount is provided with the laterally extending projections spaced longitudinally thereon from said straps for engaging the other side of said panel to retain said mount against movement from the panel.

5. A flexible strap fastener to be secured in an opening in a panel or the like from one side of the panel and to adjustably retain a bundle of wires or other articles comprising an elongated head strap portion having a retaining head spaced from an inner end, an elongated tail strap portion having an inner end, and a resilient mount portion secured to said inner ends of said head and tail strap portions and extending laterally therefrom for longitudinally interconnecting said head and tail strap portions and for resiliently engaging the panel in the opening thereof to fasten the flexible strap to the panel, said mount portion is generally U-shaped and normally open with its base portion secured to and interconnecting said ends of said head and tail straps, said retaining head being adapted to longitudinally adjustably receive and retain said tail strap to form the flexible strap fastener into a loop of adjustable size for retaining various sized articles.

6. A flexible strap fastener as defined in claim 5 wherein said mount portion is generally U-shaped and normally open with the base portion thereof secured to and interconnecting said ends of said head and tail straps, and the legs of said mount being spaced apart laterally with respect to said head and tail straps.

7. A flexible strap fastener as defined in claim 5 wherein said mount base portion is normally generally flat under conditions of tension loading of said head and tail straps, and resiliently biased against direct movement of said mount legs together, whereby said mount legs will be normally expanded laterally apart by the normal resilience thereof and as urged by tension loading of said head and tail straps to retain said mount with the opening of the panel.

8. A flexible strap fastener as defined in claim 5 wherein said retaining head is adapted to releasably receive and retain said tail strap to form the flexible strap fastener into a releasable article retaining loop.

9. A flexible strap fastener as defined in claim 5 wherein said mount is provided with the laterally extending projections spaced longitudinally thereon from said straps for engaging the other side of said panel to retain said mount against movement from the panel.

10. A flexible strap fastener to be secured in an opening in a panel or the like from one side of the panel and to adjustably retain a bundle of wires or other articles comprising an elongated head strap portion having a retaining head spaced from an inner end, an elongated tail strap portion having an inner end, and a resilient mount portion secured to said inner ends of said head and tail strap portions and extending laterally therefrom for longitudinally interconnecting said head and tail strap portions and for resiliently engaging the panel in the opening thereof to fasten the flexible strap to the panel, said head and tail ends being bifurcated with a normally open bias and a normally open position when said straps are in tension and said mount portion is generally U-shaped with a normally open bias and the legs thereof each secured to respective branches of said bifurcated head and tail strap ends, whereby said mount portion and said bifurcated strap ends may be laterally compressed manually or otherwise against the biases thereof to facilitate insertion of said mount in the panel opening and subsequently released to exert the biases thereof against the panel adjacent the opening thereof to fasten said strap fastener to said panel.

11. A flexible strap fastener as defined in claim 10 wherein said retaining head is adapted to releasably receive and retain said tail strap to form the flexible strap fastener into a releasable article retaining loop.

12. A flexible strap fastener as defined in claim 10 wherein said mount is provided with the laterally extending projections spaced longitudinally thereon from said straps for engaging the other side of said panel to retain said mount against movement from the panel.

13. A flexible strap fastener to be secured in an opening in a panel or the like from one side of the panel and to adjustably retain a bundle of wires or other articles comprising an elongated head strap portion having a retaining head spaced from an inner end, an elongated tail strap portion having an inner end, and a resilient mount portion secured to said inner ends of said head and tail strap portions for longitudinally interconnecting said head and tail strap portions and for resiliently engaging the panel in the opening thereof to fasten the flexible strap to the panel, said retaining head being adapted to longitudinally adjustably receive and retain said tail strap to form the flexible strap fastener into a loop of adjustable size for retaining various sized articles, said mount being elongated, flexible, normally biased straight and having a flexible central nose portion to facilitate localized tendency for bending about said central nose portion, whereby said mount may be bent and compressed against the bias thereof to provide a tapered central portion to facilitate insertion of said mount in a panel opening and subsequently released therein to allow said mount to exert the bias thereof against the panel adjacent the opening thereof to fasten said strap fastener to said panel.

14. A flexible strap fastener as defined in claim 13 wherein said mount is provided with flanges on opposite sides of said central nose portion and extending laterally therefrom to limit insertion of said mount in the panel opening.

15. A flexible strap fastener as defined in claim 13 wherein said mount is provided with projections thereon adjacent said nose portion respectively between said nose and said flanges and spaced from said flanges to cooperate with said flanges to engage said panel on the side thereof opposite said flanges to restrain said mount within the panel opening.

16. A flexible strap fastener as defined in claim 13 wherein said retaining head is adapted to releasibly receive and retain said tail strap to form the flexible strap fastener into a releasable article retaining loop.

References Cited
UNITED STATES PATENTS

| | | | |
|---|---|---|---|
| 3,286,694 | 11/1966 | Landy | 248—71 X |
| 3,302,913 | 2/1967 | Collyer | 248—73 |
| 3,126,184 | 3/1964 | Kropp | 248—73 |
| 3,088,702 | 5/1963 | Orenick | 248—71 |
| 3,259,347 | 7/1966 | Yates | 248—73 |

CHANCELLOR E. HARRIS, Primary Examiner

U.S. Cl. X.R.

248—73, 74 PB

UNITED STATES PATENT OFFICE
CERTIFICATE OF CORRECTION

Patent No. 3,667,710                Dated June 6, 1972

Inventor(s) Roy A. Moody and Jack E. Caveney

It is certified that error appears in the above-identified patent and that said Letters Patent are hereby corrected as shown below:

Column 2,      line 12:      delete "and releasable retaining straps and a" insert --are releasable and reusable, and the--;

line 71:      "sectional" should be --sectioned--;

Column 4,      line 36:      "of" should be --or--;

Column 8, line 1(Claim 3, line 2):
                           before "retain" insert --in said retaining head is adapted to releasably receive and--;

Column 10, line 4(Claim 15, line 1):
                           "13" should be --14--.

Signed and sealed this 30th day of January 1973.

(SEAL)
Attest:

EDWARD M.FLETCHER,JR.              ROBERT GOTTSCHALK
Attesting Officer                      Commissioner of Patents